M. KOGAN.
RESILIENT WHEEL.
APPLICATION FILED JAN. 17, 1916.
1,196,702. Patented Aug. 29, 1916.
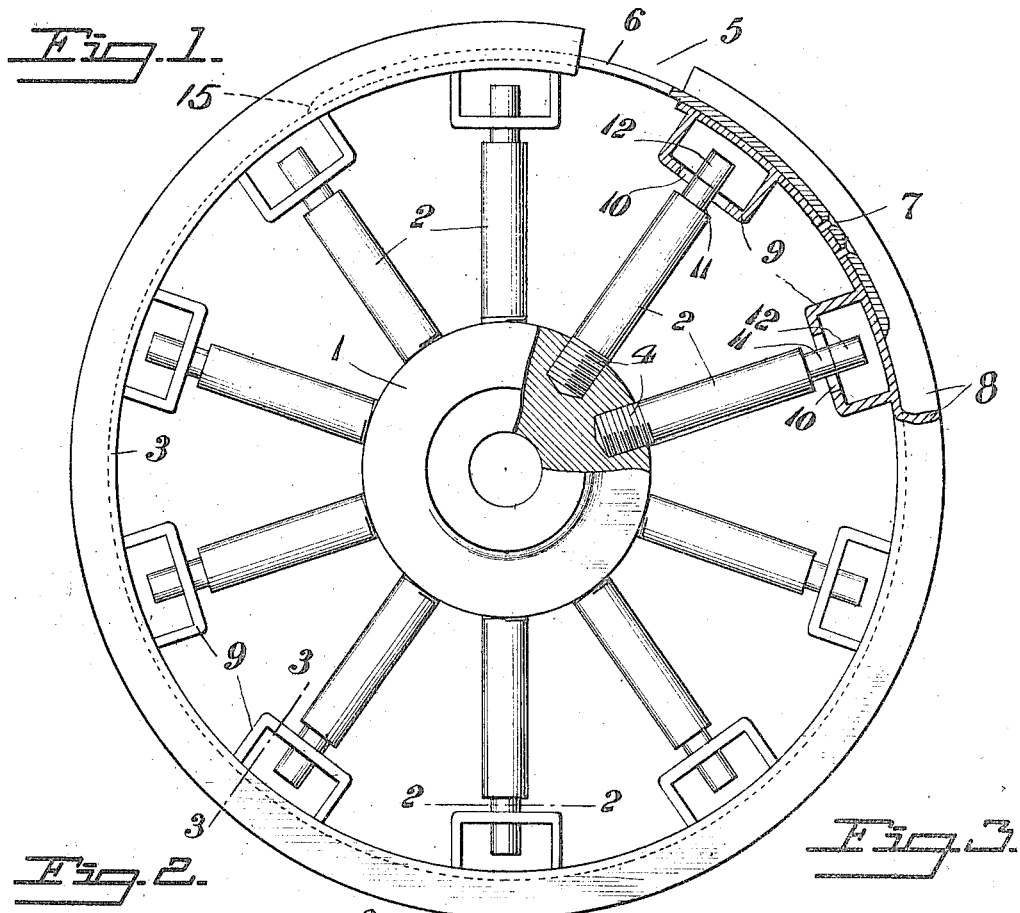
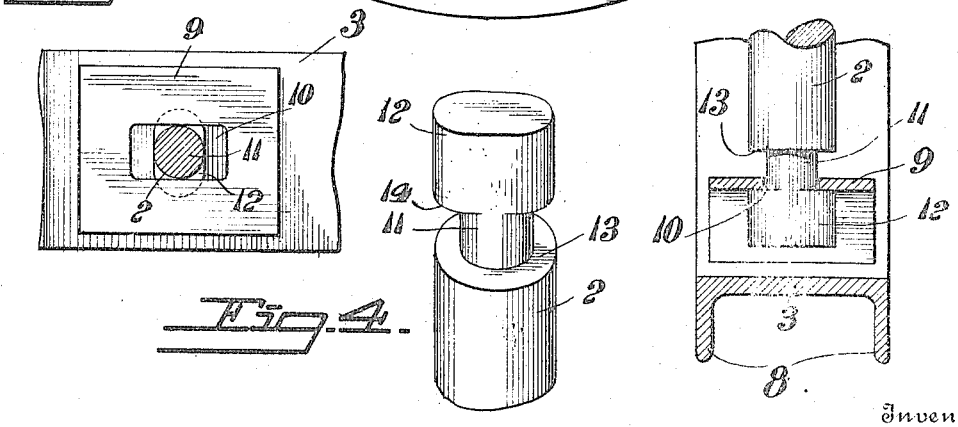
Witnesses
John D. Spalding,
R. M. Smith.
Inventor
Michael Kogan
By Victor J. Evans
Attorney

UNITED STATES PATENT OFFICE.

MICHAEL KOGAN, OF LAWRENCEVILLE, ILLINOIS.

RESILIENT WHEEL.

1,196,702.

Specification of Letters Patent.

Patented Aug. 29, 1916.

Application filed January 17, 1916. Serial No. 72,545.

*To all whom it may concern:*

Be it known that I, MICHAEL KOGAN, a citizen of the United States, residing at Lawrenceville, in the county of Lawrence and State of Illinois, have invented new and useful Improvements in Resilient Wheels, of which the following is a specification.

This invention relates to resilient wheels, the object of the present invention being to provide in connection with a hub and spokes having a normally rigid or fixed relation to each other, a resilient tire carrying rim of the split variety, the same being so associated with and related to the spokes of the wheel that said rim may readily contract and expand to a limited extent for the purpose of absorbing all ordinary road shocks and vibrations and prevent the transmission of the same to the frame and body of the vehicle or machine upon which the wheel is used.

A further object of the invention is to provide means of a novel character whereby the resilient rim is associated with the spokes of the wheel in such manner that the rim may be detached from and connected to the spokes by partially turning the spokes on their longitudinal axes.

A further object of the invention is to so construct the resilient rim and spokes that the expansive and contractile movements of the resilient rim will be limited within certain bounds to prevent injury to any part of the wheel structure.

With the above and other objects in view, the invention consists in the novel construction, combination and arrangement of parts, as herein described, illustrated and claimed.

In the accompanying drawings:—Figure 1 is a side elevation partly in section of a resilient wheel embodying the present invention. Fig. 2 is a section on an enlarged scale on the line 2—2 of Fig. 1. Fig. 3 is also an enlarged section on the line 3—3 of Fig. 1. Fig. 4 is a detail perspective view of the outer end portion of one of the spokes.

1 designates the hub of the wheel of this invention, 2 the spokes, and 3 the rim. The spokes 2 have their inner end portions threaded as shown at 4 and screwed into threaded sockets leading inwardly from the periphery of the body of the hub 1. This enables the spokes to be connected and fastened to the hub and also to be turned on their longitudinal or major axes for a purpose which will presently appear.

The rim 3 is of the split variety, the split extending transversely of the rim and being of sufficient width to leave a considerable gap 5 which is crossed by a tire supporting gap-bridging strip 6 having one end portion thereof fastened to an end portion of the rim 3 as shown at 7, while the other free end portion of the bridging strip 6 is slidingly supported by the floor of the rim 3, the latter being shown as provided with the usual tire retaining flanges 8.

The rim 3 is provided along the inner side thereof with a circular series of keepers 9 each substantially rectangular in side view when taken in conjunction with the rim 3. The inner portion of each keeper 9 is arranged in spaced relation to the inner face of the rim 3 and is formed with a slot 10 which is elongated longitudinally of the rim 3. Each of the spokes 2 has its outer end portion reduced in diameter to form a neck or shank 11 and at the outer extremity of said neck or shank is an oblong head 12 which, when in its normal keeper-engaging position, is elongated transversely of the rim or at a right angle to the direction of elongation of the slot 10 in the respective keeper 9. In thus forming the shank 11 and head 12, the spoke is provided with an annular shoulder 13 which coöperates with the keeper 9 to limit the inward movement of the adjacent portion of the resilient rim 3. The under side of the head 12 forms another shoulder 14 which coacts with the keeper 9 to limit the outward or expansive movement of the resilient rim. The relative movement between the outer end of each spoke and the resilient rim, in the direction of length of the latter, is limited by the length of the respective slot 10.

From the foregoing description, taken in connection with the accompanying drawings, it will now be understood that when the parts of the wheel are properly assembled as shown in Fig. 1, the coöperation between the outer ends of the spokes and the keepers on the rim provides for limiting the extent to which the resilient rim may expand and contract and incidentally the movement of the rim and the keepers thereon in relation to the spokes, in a direction lengthwise of the rim. A tire of any desired form, construction or material may be placed around the rim of the wheel, and across the gap said tire will be supported by the bridging strip 6 the free end of which is preferably chamfered or beveled as shown at 15 to prevent chafing or injuring the rim face of the tire which will ordinarily have a protecting covering of wear-resisting material applied thereto. It will further be understood that by giving the spokes 2 a quarter turn, the heads 12 will be in a position to pass through the slots 10, thus enabling the resilient rim to be disconnected from all of the spokes, should occasion arise therefor. It will further be seen that the shoulder 13 limits the outward radial movement of each spoke in relation to the rim by coming in contact with the keeper 9, while the shoulder 14 limits the inward movement of the spoke by coming in contact with the keeper. The resilient rim should be made sufficiently heavy to remain normally concentric with the hub under ordinary conditions while the machine is standing still or being operated upon a smooth road surface, and so that when a rough surface is encountered or obstructions of any kind, the rim will yield inwardly and thereby absorb the shocks and prevent the transmission of the same to the frame and body of the vehicle.

Having thus described my invention, I claim:—

1. In a wheel, the combination of a hub, spokes radially disposed in relation to the hub and adapted to be turned on their major axes, a resilient split rim, spoke-holding keepers on the inner face of said rim formed with spoke-receiving slots elongated longitudinally of the rim, and heads on the outer extremity of said spokes serving to limit the expansion of the rim and the longitudinal movement of the spokes in relation to the rim and permit the extremities of the spokes to move longitudinally of the rim.

2. In a wheel, the combination of a hub, spokes radially disposed in relation to the hub and adapted to be turned on their major axes, a resilient split rim, a tire-supporting strip bridging the split in the rim and fastened to one end portion of the rim, spoke-holding keepers on the inner face of said rim formed with spoke-receiving slots elongated longitudinally of the rim, and heads on the outer extremity of said spokes serving to limit the expansion of the rim and the longitudinal movement of the spokes in relation to the rim and permit the extremities of the spokes to move longitudinally of the rim.

3. In a wheel, the combination of a hub, spokes radially disposed in relation to the hub and adapted to be turned on their major axes, a resilient split rim, spoke-holding keepers on the inner face of said rim formed with spoke-receiving slots elongated longitudinally of the rim, and heads on the outer extremity of said spokes serving to limit the expansion of the rim and the longitudinal movement of the spokes in relation to the rim and permit the extremities of the spokes to move longitudinally of the rim, said heads when in their normal relation to the rim being elongated in a direction substantially at a right angle to the length of the slots in the keepers.

4. In a wheel, the combination of a hub, spokes radially disposed in relation to the hub and adapted to be turned on their major axes, a resilient split rim, spoke-holding keepers on the inner face of said rim formed with spoke-receiving slots elongated longitudinally of the rim, heads on the outer extremity of said spokes serving to limit the expansion of the rim and the longitudinal movement of the spokes in relation to the rim and permit the extremities of the spokes to move longitudinally of the rim, and shoulders on said spokes which coact with the keepers to limit the contraction of the rim.

In testimony whereof I affix my signature in presence of two witnesses.

MICHAEL KOGAN.

Witnesses:
TRACY CANADAY,
ROWLAND A. JUDY.

Copies of this patent may be obtained for five cents each, by addressing the "Commissioner of Patents, Washington, D. C."